(12) United States Patent
Yokohata et al.

(10) Patent No.: US 9,453,750 B2
(45) Date of Patent: Sep. 27, 2016

(54) FLUID INSTRUMENT INFORMATION PROVIDING DEVICE

(71) Applicant: Panasonic Intellectual Property Management Co., Ltd., Osaka-shi, Osaka (JP)

(72) Inventors: Mitsuo Yokohata, Osaka (JP); Motoyuki Nawa, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 62 days.

(21) Appl. No.: 14/394,905

(22) PCT Filed: Apr. 16, 2013

(86) PCT No.: PCT/JP2013/002558
§ 371 (c)(1),
(2) Date: Oct. 16, 2014

(87) PCT Pub. No.: WO2013/157247
PCT Pub. Date: Oct. 24, 2013

(65) Prior Publication Data
US 2015/0128721 A1    May 14, 2015

(30) Foreign Application Priority Data

Apr. 17, 2012 (JP) ................. 2012-093990

(51) Int. Cl.
*G06F 1/00* (2006.01)
*G01F 3/22* (2006.01)
*F23N 5/26* (2006.01)
*G01F 15/06* (2006.01)
*G01F 15/075* (2006.01)
*H01M 8/04* (2016.01)

(52) U.S. Cl.
CPC . *G01F 3/22* (2013.01); *F23N 5/26* (2013.01); *G01F 15/061* (2013.01);

(Continued)

(58) Field of Classification Search
None
See application file for complete search history.

(56) References Cited

U.S. PATENT DOCUMENTS

| 2005/0171645 A1 | 8/2005 | Oswald et al. |
| 2008/0270045 A1 | 10/2008 | Miyata et al. |

(Continued)

FOREIGN PATENT DOCUMENTS

| CN | 101133302 A | 2/2008 |
| CN | 101529213 A | 9/2009 |

(Continued)

OTHER PUBLICATIONS

International Search Report in corresponding International Application No. PCT/JP2013/002558, dated Jul. 16, 2013, 1 page.

(Continued)

*Primary Examiner* — Harshad R Patel
(74) *Attorney, Agent, or Firm* — Brinks Gilson & Lione (57) ABSTRACT

A fluid instrument information providing device comprises a gas usage amount integrating section for integrating the usage amount of a gas for each of the kinds of gas instruments which is determined by a gas instrument determiner section, based on a change in the flow of the gas which is measured by the flow measuring section; an instrument information generating section for generating a plurality of gas instrument information including charge information relating to the gas instrument corresponding to the integrated usage amount for each kind of the gas instrument which is integrated by the gas usage amount integrating section, based on the integrated usage amount; an information selecting section operated by a user to select gas instrument information from among the gas instrument information generated by the gas instrument information generating section; and an output section for outputting instrument information selected by the information selecting section.

5 Claims, 6 Drawing Sheets (52) U.S. Cl.
CPC ........ *G01F 15/066* (2013.01); *G01F 15/0755* (2013.01); *F23N 2023/38* (2013.01); *F23N 2031/20* (2013.01); *F23N 2031/30* (2013.01); *F23N 2037/02* (2013.01); *H01M 8/04425* (2013.01); *H01M 8/04776* (2013.01)

(56) References Cited

U.S. PATENT DOCUMENTS

| | | | |
|---|---|---|---|
| 2009/0271128 A1 | 10/2009 | Umekage et al. | |
| 2010/0326548 A1 | 12/2010 | Miyata et al. | |
| 2011/0012738 A1* | 1/2011 | Nakamura | F23N 5/184 340/632 |
| 2012/0221259 A1* | 8/2012 | Yokohata | G01F 15/00 702/45 |
| 2012/0221260 A1* | 8/2012 | Kamimura | G01F 25/0053 702/45 |
| 2014/0316721 A1* | 10/2014 | Yokohata | H01M 8/04388 702/45 |

FOREIGN PATENT DOCUMENTS

| | | |
|---|---|---|
| CN | 101578504 A | 11/2009 |
| EP | 2 098 833 A1 | 9/2009 |
| JP | 9-318407 A | 12/1997 |
| JP | 2005-310514 A | 11/2005 |
| JP | 2007-292393 A | 11/2007 |
| JP | 2008-185484 A | 8/2008 |
| JP | 2008-185485 A | 8/2008 |
| JP | 2008-196991 A | 8/2008 |
| JP | 2009-168651 A | 7/2009 |

OTHER PUBLICATIONS

Extended European Search Report in corresponding European Application No. 13777887.4, dated Feb. 9, 2015, 9 pages.

Office Action and Search Report and English language translation of Search Report in corresponding Chinese Application No. 201380020426.7, dated Jul. 14, 2016, 8 pages.

* cited by examiner

FLUID INSTRUMENT INFORMATION PROVIDING DEVICE

This application is a 371 application of PCT/JP2013/002558 having an international application date of Apr. 16, 2013, which claims priority to JP2012-093990 filed Apr. 17, 2012, the entire contents of which are incorporated herein by reference.

TECHNICAL FIELD

The present invention relates to a fluid instrument information providing device which provides information relating to an instrument which uses a fluid.

BACKGROUND ART

Conventionally, there has been proposed a method of providing gas charges (gas rates, gas fees) corresponding to respective gas instruments to increase the sales of the gas instruments which use a gas as a fluid. For example, Patent Literature 1 discloses a method of calculating a discount charge corresponding to the usage amount of the gas for a gas instrument which consumes a great amount of the gas, such as a gas burner in a winter season.

So far, fuel cells have been put into practical use in large-scale or medium-scale power generation equipment. In recent years, fuel cells for household use have been developed, and have been available in the market. Hydrogen is required to generate electric power in the fuel cells. In the fuel cells for household use, a hydrocarbon based gas (city gas or liquefied petroleum gas (LP gas), etc.) supplied for home is used as a hydrogen supply source. Therefore, the fuel cells for household use can be deemed as "gas instrument", because of the use of the gas. To achieve energy savings in a society in recent years, various charge menus for the fuel cells have been proposed. For example, Patent Literature 2 discloses a fuel cell system which decides the gas charge based on a plurality of payment structures corresponding to utilization (gas consumption amount, power generation amount, exhaust heat amount) of the fuel cell.

CITATION LIST

Patent Literature

Patent Literature 1: Japanese Laid-Open Patent Application Publication No. Hei. 9-318407
Patent Literature 2: Japanese Laid-Open Patent Application Publication No. 2005-310514

SUMMARY OF THE INVENTION

Technical Problem

However, in the above stated prior art, information relating to the gas instrument provided to users is limited to the gas charge. Also, there has been a room for improvement of a setting method of the gas charge.

Such a problem is common to information service (provision of information) relating to instruments which use other fluids such as water.

The present invention is directed to solving the above described problem, and an object of the present invention is to provide a fluid instrument information providing device which is capable of providing users with various and useful information relating to utilization of instruments which use a fluid.

Solution to Problem

To solve the above described problem associated with the prior art, a fluid instrument information providing device of the present invention comprises a flow measuring section for measuring a flow of a fluid flowing in a fluid passage, an instrument determiner section for determining kinds of a plurality of instruments which use the fluid and are connected to the fluid passage in positions which are downstream of the flow measuring section, based on a change in the flow of the fluid which is measured by the flow measuring section, which change occurs with time; a fluid usage amount integrating section for integrating a usage amount of the fluid for each of the kinds of the plurality of instruments which is determined by the instrument determiner section, based on the change in the flow of the fluid which is measured by the flow measuring section; an instrument information generating section for generating a plurality of instrument information including charge information relating to the instrument corresponding to the integrated usage amount for each kind of the instrument which is integrated by the fluid usage amount integrating section, based on the integrated usage amount; a selecting section operated by a user to select instrument information from among the plurality of instrument information generated by the instrument information generating section; and an output section for outputting instrument information selected by the selecting section.

In this configuration, the kind of the instrument which is using the fluid is determined based on the change in the flow of the fluid, which change occurs with time, and the plurality of instrument information including the charge information relating to the instrument corresponding to the integrated usage amount of the fluid are generated based on the integrated usage amount of the fluid for each kind determined. Then, the user selects any instrument information from among the plurality of instrument information. In this way, various and useful information relating to utilization of instruments can be provided to the user.

Advantageous Effects of Invention

As described above, in accordance with present invention, it is possible to provide users with various and useful information relating to utilization of instruments which use a fluid.

DETAILED DESCRIPTION OF THE PREFERRED EMBODIMENTS

According to Embodiment 1, a fluid instrument information providing device of the present invention comprises a flow measuring section for measuring a flow of a fluid flowing in a fluid passage, an instrument determiner section for determining kinds of a plurality of instruments which use the fluid and are connected to the fluid passage in positions which are downstream of the flow measuring section, based on a change in the flow of the fluid which is measured by the flow measuring section, which change occurs with time; a fluid usage amount integrating section for integrating a usage amount of the fluid for each of the kinds of the plurality of instruments which is determined by the instrument determiner section, based on the change in the flow of the fluid which is measured by the flow measuring section; an instrument information generating section for generating a plurality of instrument information including charge information relating to the instrument corresponding to the integrated usage amount for each kind of the instrument which is integrated by the fluid usage amount integrating section; a selecting section for selecting instrument information by a user from among the plurality of instrument information generated by the instrument information generating section; and an output section for outputting instrument information selected by the selecting section.

In this configuration, the kind of the instrument which is using the fluid is determined based on the change in the flow of the fluid, which change occurs with time, and the plurality of instrument information including the charge information relating to the instrument corresponding to the integrated usage amount of the fluid are generated based on the integrated usage amount of the fluid for each kind determined. Then, the user selects any instrument information from among the plurality of instrument information. In this way, various and useful information relating to utilization of instruments can be provided to the user.

According to a second aspect of the present invention, in the fluid instrument information providing device of the first aspect, the plurality of instrument information are charge information of the instrument corresponding to the instrument information, information relating to maintenance of the instrument corresponding to the instrument information, and information relating to replacement by purchase of the instrument corresponding to the instrument information. In this configuration, the user can be provided with useful information relating to utilization of the instrument such as a timing of maintenance or replacement (by purchase) of the instrument, as well as the charge information of the instrument.

According to a third aspect of the present invention, in the fluid instrument information providing device of the first or second aspect, the output section is at least either a display unit for displaying the selected instrument information or a notification unit for notifying the selected instrument information. In this configuration, the display unit or the notification unit can more reliably provide the user with the selected instrument information.

According to a fourth aspect of the present invention, in the fluid instrument information providing device of any one of the first to third aspects, the fluid is a gas, and the instrument is a gas instrument which uses the gas. In accordance with this configuration, the user can be provided with the information relating to utilization of the gas instrument. For example, the gas instrument may include a fuel cell.

According to a fifth aspect of the present invention, there is provided a program for causing a computer to function as a part or all of the fluid instrument information providing device of any one of the first to fourth aspects. In accordance with this configuration, by storing this program in the computer, a part or all of the fluid instrument information providing device can be easily implemented by using the computer. In addition, by storing the program in a storage medium or delivering the program by using a communication line, the program can be easily delivered or installed.

Hereinafter, preferred embodiments of the present invention will be described with reference to the drawings. Throughout the drawings, the same or corresponding components are identified by the same reference symbols and will not be described repeatedly.

Embodiment 1

Firstly, the exemplary configuration of a fluid instrument information providing device according to Embodiment 1 of the present invention and the exemplary utilization of a fluid will be specifically described with reference to FIG. 1. Any fluid instrument may be used so long as it uses a fluid. As examples of the fluid instrument, there are a gas instrument, a tap water instrument, etc. Hereinafter, the gas instrument will be exemplarily described.

Figure 1:
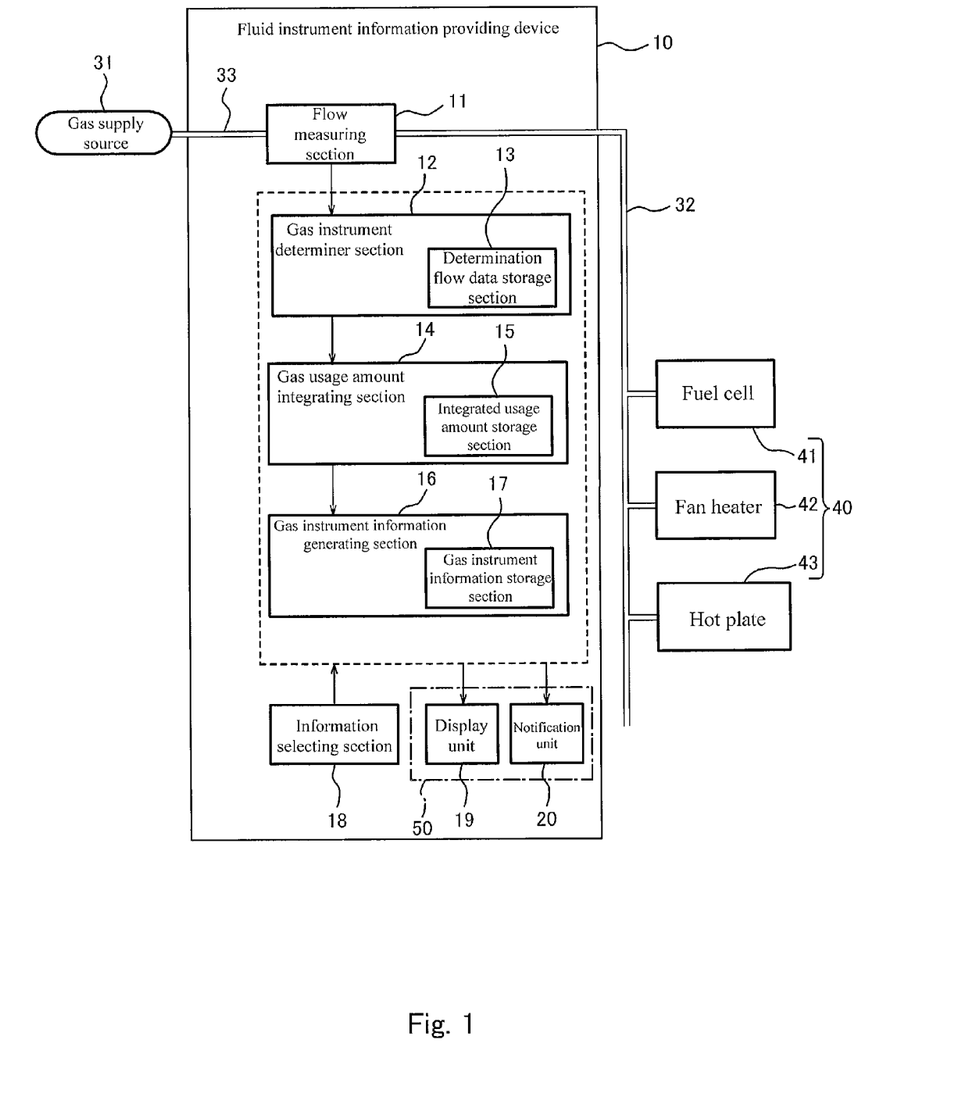
FIG. 1 is a block diagram showing an example of components of a fluid instrument information providing device according to Embodiment 1 of the present invention, and utilization of a fluid.

As shown in FIG. 1, a fluid instrument information providing device 10 of the present embodiment is a device which provides a user with information of a plurality of gas instruments which use a gas as the fluid. The fluid instrument information providing device 10 is connected to a gas supply source 31 and a gas instrument 40 via a gas supply line 32.

The gas supply source 31 is connected to infrastructure such as a raw material gas source (e.g., city gas or liquefied petroleum gas (LP gas)), and supplies a hydrocarbon based gas (e.g., natural gas containing methane as a major component, LP gas containing propane as a major component) to the gas supply line 32 and the gas instrument 40, according to a demand. As the gas supply line 32, a known gas supply pipe is used, but a path using a known pipe-shaped member other than the gas pipe may be used. Although not shown in FIG. 1, the gas supply line 32 is provided with various on-off valves, branch mechanisms, etc.

As the gas instrument 40, for example, a fuel cell 41, a fan heater 42, and a hot plate 43 are illustrated. The specific configuration of the fuel cell 41 is not particularly limited. In the present embodiment, for example, the fuel cell 41 includes a reformer for reforming the gas, and a fuel cell stack which is supplied with a reformed gas from the reformer and generates electric power.

The fuel cell stack includes a plurality of power generation cells which are stacked together. The specific configuration of each power generation cell is not particularly limited. For example, as the power generation cell, there are known fuel cells such as a polymer electrolyte fuel cell, a solid oxide fuel cell, a phosphoric acid fuel cell, and a molten carbonate fuel cell. The specific configurations of a desulfurization unit, a raw material supply unit, an oxidizing gas supply unit, the reformer, a heat supply unit, lines and valves are not particularly limited, but known configurations may be used.

The fan heater 42 is a heating instrument which sends out combustion heat of the gas by a fan. The specific configuration of the fan heater 42 is not particularly limited. A known fan heater for household use or business use is used as the fan heater 42. The hot plate 43 is also referred to as a gas range or a gas stove, and is a cooking instrument. The specific configuration of the hot plate 43 is not particularly limited. A known hot plate for household use or business use is used as the hot plate 43. The gas instruments 40 which are other than the fan heater 42 or the hot plate 43 are, for example, a heating instrument such as a gas stove and a gas floor heating unit, a gas cooking instrument such as a gas rice cooker and a gas oven, and a gas hot water supply unit, but is not particularly limited to these.

The fluid instrument information providing device 10 is attached to the gas supply line 32 to measure the flow of the gas flowing into the plurality of gas instruments 40 including the fuel cell 41. The fluid instrument information providing device 10 includes a flow measuring section 11, a gas instrument determiner section 12, a determination flow data storage section 13, a gas usage amount integrating section 14, an integrated usage amount storage section 15, a gas instrument information generating section 16, a gas instrument information storage section 17, an information selecting section 18, and an output section 50.

The specific configurations of the gas instrument determiner section 12, the determination flow data storage section 13, the gas usage amount integrating section 14, the integrated usage amount storage section 15, the gas instrument information generating section 16, the gas instrument information storage section 17, the information selecting section 18, the display unit 19, and the notification unit 20, are not particularly limited, but known configurations may be used. Specifically, for example, the gas instrument information generating section 16 may be a functional configuration of a processor (not shown in FIG. 1) provided in the fluid instrument information providing device 10 (functional configuration implemented by the processor's operation according to a program stored in a storage section which is not shown), or a known logic circuit such as a switching element, a subtractor, and a comparator. The determination flow data storage section 13, the integrated usage amount storage section 15, and the gas instrument information storage section 17, may be a known non-volatile memory, a known hard disc drive, a combination of these, etc.

The fluid instrument information providing device 10 may include components in addition to the flow measuring section 11, the gas instrument determiner section 12, the determination flow data storage section 13, the gas usage amount integrating section 14, the integrated usage amount storage section 15, the gas instrument information generating section 16, the gas instrument information storage section 17, the information selecting section 18, the display unit 19, and the notification unit 20. For example, the fluid instrument information providing device 10 may include a control section including the processor, a storage section other than the determination flow data storage section 13, the integrated usage amount storage section 15, and the gas instrument information storage section 17, a timer section, a gas cut-off section, etc. However, the components of the fluid instrument information providing device 10 are not limited to these.

The gas instrument determiner section 12, the determination flow data storage section 13, the gas usage amount integrating section 14, the integrated usage amount storage section 15, the gas instrument information generating section 16, and the gas instrument information storage section 17 are configured as a processor constituting a microcomputer or the like, and operation programs. The processor executes predetermined operation programs to perform the corresponding processing, thereby implementing the functions. The storage section may be a memory within the microcomputer, an external memory such as a hard disc drive, or a storage unit which can be accessed by a computer connected thereto via a network.

The flow measuring section 11 is configured to measure the flow of the gas in a fluid passage 33 through which the gas flows. The specific configuration of the flow measuring section 11 is not particularly limited. In the present embodiment, for example, an ultrasonic flow meter unit which measures the flow of the fluid such as the gas by using an ultrasonic wave is used. A typical ultrasonic flow meter unit employs an inverse transit time difference method. In the inverse transit time difference method, ultrasonic transducers (transmitters/receivers) are provided at an upstream side and a downstream side, respectively, of the fluid passage 33 which is a flow measurement target, and alternately transmit and receive an ultrasonic wave pulse. In this method, the flow velocity of the fluid is found by utilizing the transit time (propagation time) in a forward direction and the transit time in a reverse direction, and the flow of the fluid can be measured by using the flow velocity and the cross-sectional area of the fluid passage 33. Although the flow measuring section 11 is schematically shown in FIG. 1, it is a part of the fluid instrument information providing device 10 and is connected to the gas supply line 32. The specific configuration of the ultrasonic flow meter unit which utilizes the inverse transit time difference method and the specific configuration of the fluid passage 3 are not particularly limited, and known configurations may be used. Also, as the flow measuring section 11, a gas flow meter such as a flow sensor meter unit or a fluidic flow meter unit is used instead of the ultrasonic flow meter unit. However, the flow measuring section 11 is not limited to these.

Figures 2A, 2B:
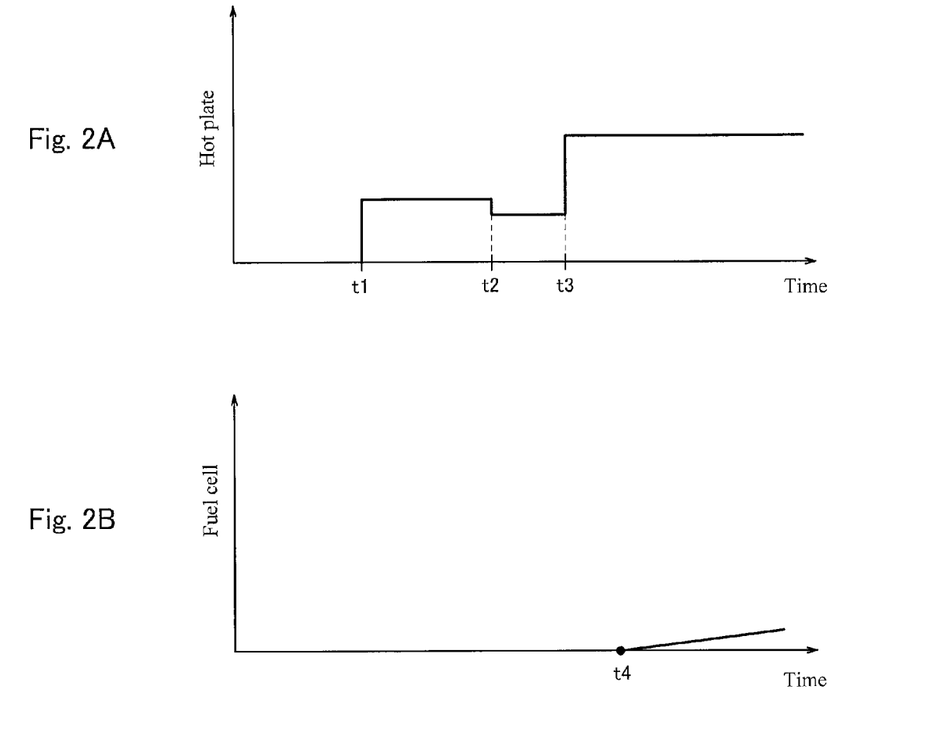
FIGS. 2A to 2C are time charts showing examples of the use states of gas instruments used in Embodiment 1.
Figure 2C:
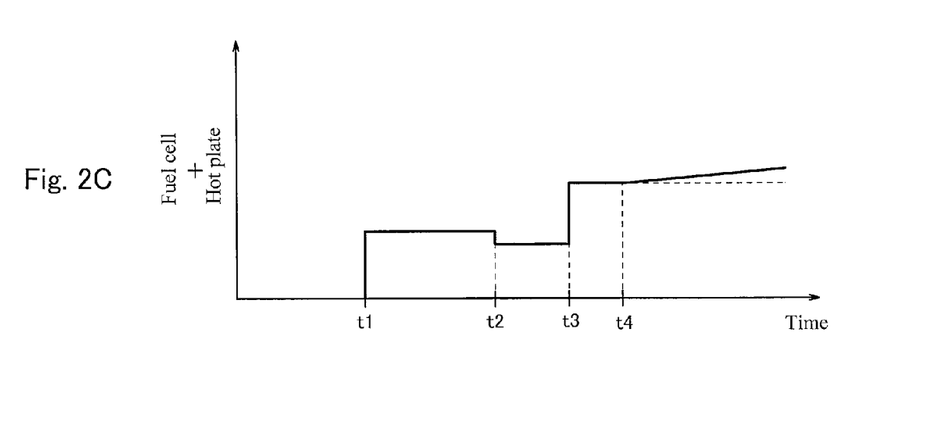

The gas instrument determiner section 12 determines the kinds of the plurality of gas instruments 40 connected in positions which are downstream of the flow measuring section 11, based on a change in the flow of the gas measured by the flow measuring section 11. FIGS. 2A to 2C are time charts showing examples of the use states of the hot plate 43 and the fuel cell 41. As shown FIG. 2A, the change in the gas flow in the holt plate which is a general gas instrument is steeper than that of the fuel cell (t1, t2, t3). In contrast, as shown in FIG. 2B, the gas flow of the fuel cell changes gently after start-up (t4). As shown in FIG. 2C, the flow measuring section 11 measures a sum of the gas flow of the hot plate and the gas flow of the fuel cell. In light of this, in the present embodiment, attention is focused on the characteristic amounts of the waveforms of the flows for the respective instruments during a period when the fluid starts to be consumed, and determination as to the general gas instrument and the fuel cell is performed. The gas instrument determiner section 12 compares the actual measurement value of the gas flow which is measured by the flow measuring section 11, to determination flow data, to determine the kind of the gas instrument 40 in use, among the gas instruments 40 connected to the gas supply line 32.

The determination flow data storage section 13 contains as the determination flow data, time-series set data of the gas flow for each kind of gas instrument. The determination flow data storage section 13 contains the determination flow data about the gas instruments 40 (fan heater 42, hot table 43, etc.) including the fuel cell 41.

The gas usage amount integrating section 14 integrates the usage amount of the gas for each kind of one of the plurality of gas instruments 40 which is determined by the gas instrument determiner section 12, based on a change in the gas flow which is measured by the flow measuring section 11, which change occurs with time.

The integrated usage amount storage section 15 is configured to store the integrated usage amount of the gas for each kind of the gas instrument, which is integrated by the gas usage amount integrating section 14. In the present embodiment, the integrated usage amount storage section 15 is configured to store the integrated usage amount from start of the use until now, for each gas instrument.

The gas instrument information generating section 16 is configured to generate a plurality of gas instrument information including charge information relating to the gas instrument corresponding to each integrated usage amount, based on the integrated usage amount of the gas for each kind of the gas instrument, which is integrated by the gas usage amount integrating section 14. The plurality of gas instrument information are charge information of the gas instrument corresponding to the gas instrument information, information relating to maintenance of the gas instrument corresponding to the gas instrument information, and information relating to replacement by purchase of the gas instrument corresponding to the gas instrument information.

Figure 3A:
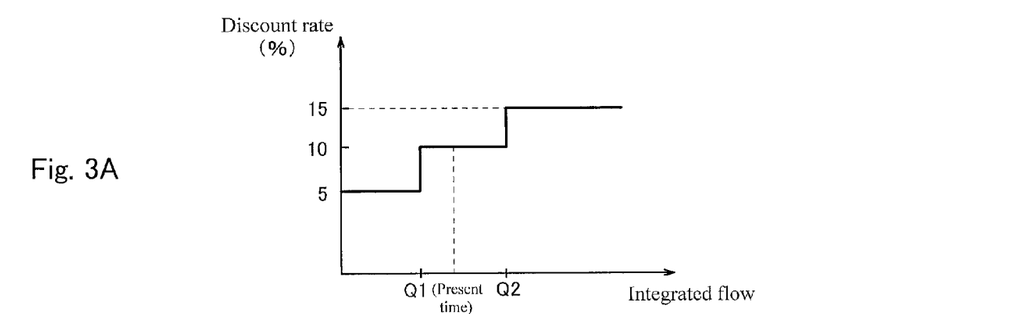
FIGS. 3A to 3C are views showing examples of gas instrument information calculated based on an integrated flow.

Next, the gas instrument information will be described with reference to FIGS. 3A to 3C. FIG. 3A is a graph showing the discount rate of the gas charge which is decided based on the integrated usage amount. In the example of FIG. 3A, for example, the discount rate of a present gas charge is calculated from a present integrated usage amount. In this example, the payment structure is set such that the discount rate is made higher as the integrated usage amount increases. For example, as the integrated usage amount increases, the discount rate is made higher by 5% in a stepwise manner. The user's present integrated usage amount is not less than Q1 and less than Q2. Therefore, the discount rate of the present gas charge is 10%. In this way, the charge information of the present gas charge including the discount rate is generated.

Figure 3B:
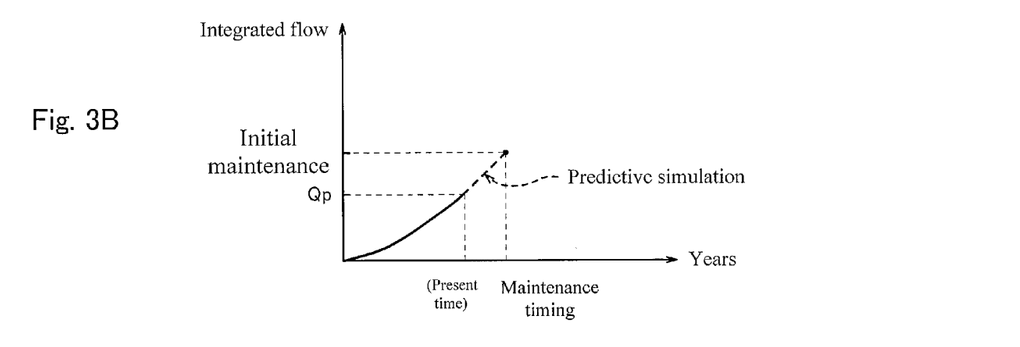

FIG. 3B is a graph showing a maintenance timing of the gas instrument which is decided based on the integrated usage amount. As shown in FIG. 3B, for example, an appropriate maintenance timing can be calculated by predicting the usage amount in the future by simulation, based on an integrated usage amount Qp of the user until a present time. In this way, the information relating to the maintenance of the gas instrument is generated.

Figure 3C:
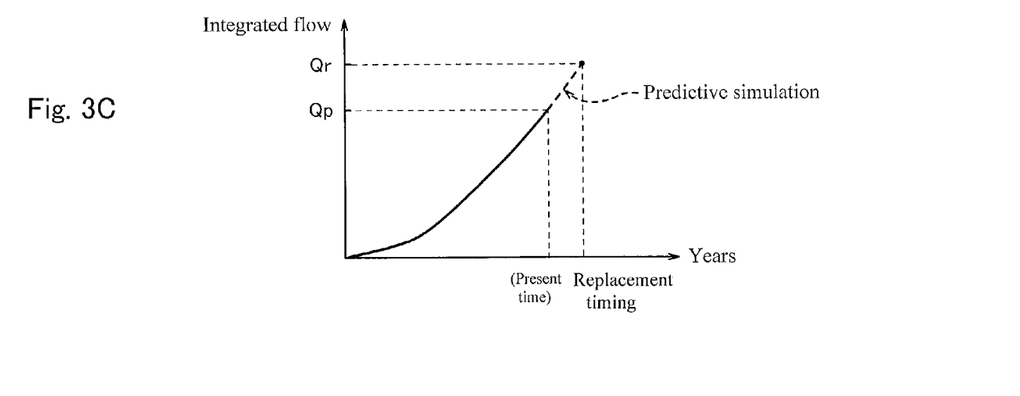

FIG. 3C is a graph showing a replacement (by purchase) timing of the gas instrument which is decided based on the integrated usage amount. As shown in FIG. 3C, for example, an appropriate replacement timing of the gas instrument can be calculated by predicting the integrated usage amount of the gas which can be used in the future by simulation, based on the integrated usage amount Qp of the user until a present time. For example, in a case where a total integrated flow Qr which can be used from start of the use until the replacement timing is a life of a fuel cell, the timing when the integrated usage amount will reach Qr in the future is calculated, and is decided as the timing of replacement. In this way, the information relating to the replacement of the gas instrument is generated.

The gas instrument information storage section 17 is configured to store the plurality of gas instrument information generated by the gas instrument information generating section 16, for each of the kinds of the gas instruments.

Figure 4A:
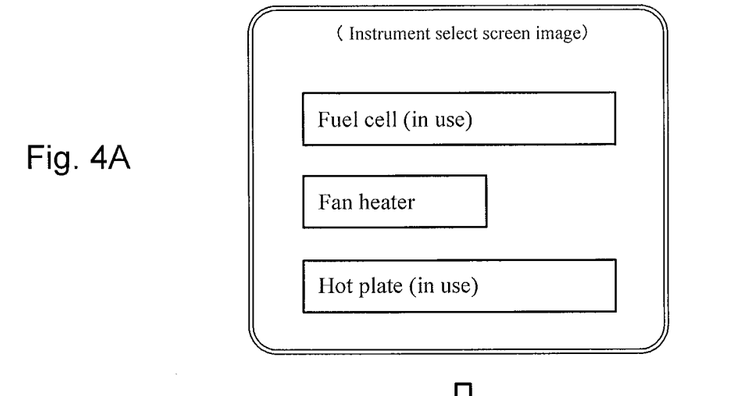
FIGS. 4A and 4B are views showing examples of a display screen image used to select the gas instrument information.
Figure 4B:
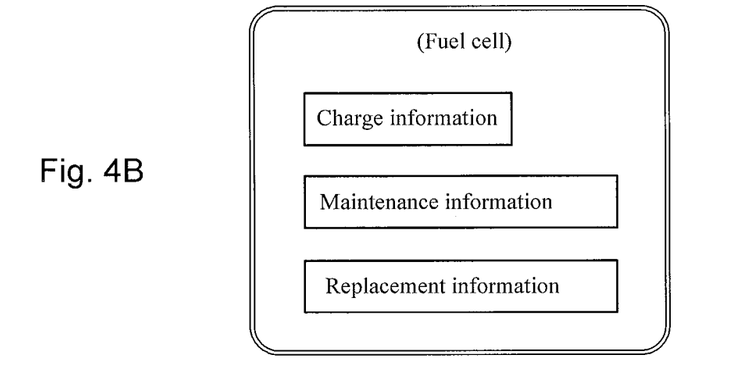

The information selecting section 18 is operated by the user to select any gas instrument information from among the plurality of gas instrument information generated by the gas instrument information generating section 16. In the present embodiment, for example, the user performs a touch-panel input of a menu displayed on a screen image. FIGS. 4A and 4B are exemplary display screen images on which the user selects the gas instrument information. In FIG. 4A, on an upper side, an example of a display screen image used to select the gas instrument is illustrated. The user can select the gas instrument the information the user wishes to browse. For example, the user touches "fuel cell (in use)" to select the fuel cell as the gas instrument. In FIG. 4B, on a lower side, an example of a display screen image used to select any of the plurality of information relating to the selected gas instrument, is illustrated. The user selects on the screen image any information from among "charge information", "maintenance information" and "replacement (by purchase) information" relating to the fuel cell selected on the previous screen image.

The output section 50 is configured to output the gas instrument information selected by the information selecting section 18. In the present embodiment, for example, the output section 50 is implemented by, for example, the display unit 19 and the notification unit 20. The display unit 19 displays the selected gas instrument information. In the present embodiment, the display unit 19 is constituted by a liquid crystal display having a touch panel function as the information selecting section 18. The display unit 19 displays the gas flow, operating state of the gas instrument, alarm, etc., as well as the gas instrument information. The notification unit 20 notifies the selected gas instrument information. The output section 50 may output the gas instrument information by using either the display unit or the notification unit.

Figure 5A:
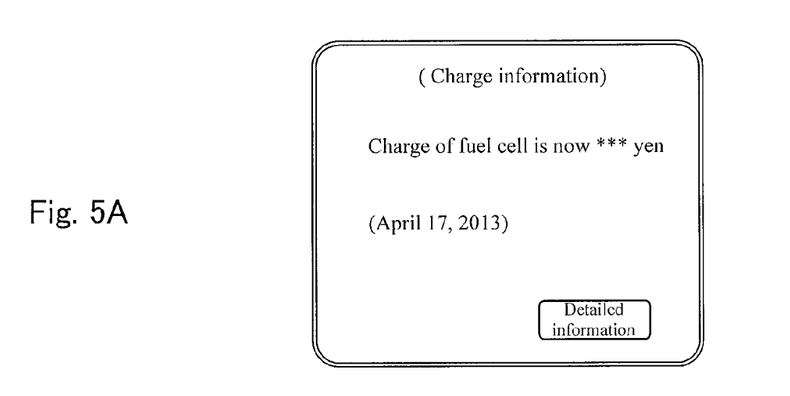
FIGS. 5A to 5C are views showing examples of a display screen image of information relating the selected gas instrument.

FIGS. 5A to 5C are views showing an example of a display screen image of information relating to the selected gas instrument. In a case where the user selects the charge information, as shown in FIG. 5A, the present gas charge of the fuel cell is displayed. At this time, the notification unit 20 may notify the present discount rate in the form of a voice. Or, the user may be notified of a decrease in price of the gas charge, in the form of a voice, whenever the integrated flow exceeds 100 m$^3$. Or, in a case where the user wishes to browse detailed information, the present screen image shifts to a next screen image by touching "detailed information" on the screen image so that the user can browse the information such as the discount rate, the integrated flow, or years that pass from the start of the use until a present time.

Figure 5B:
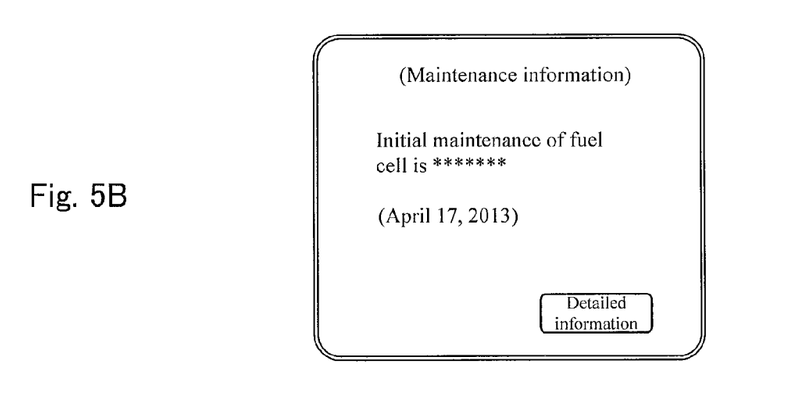

In a case where the user selects the maintenance information, as shown in FIG. 5B, the initial maintenance timing of the fuel cell is displayed. Or, in a case where the user wishes to browse detailed information, the present screen image shifts to a next screen image by touching "detailed information" on the screen image so that the user can browse the information such as the maintenance charge, the integrated flow, or years that pass from the start of the use until a present time.

Figure 5C:
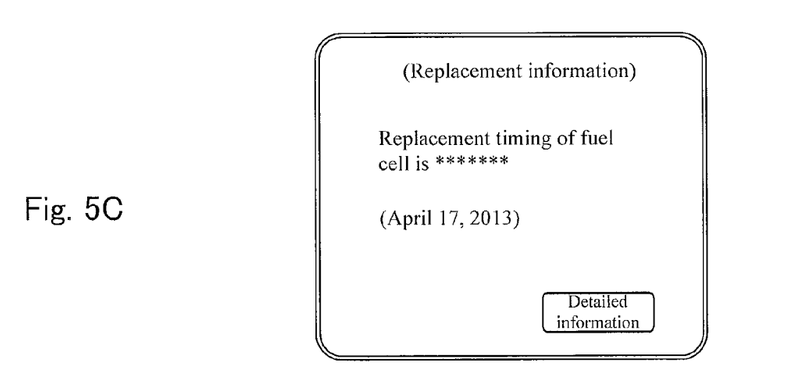

In a case where the user selects the replacement information, as shown in FIG. 5C, the replacement timing of the fuel cell is displayed. In a case where the user wishes to browse detailed information, the present screen image shifts to a next screen image by touching "detailed information" on the screen image so that the user can browse the information such as fee, integrated flow, or years that pass from the start of the use until a present time, in the case where the gas instrument is replaced by purchase.

With the above described configuration, the user can be provided with various and useful information relating to the utilization of the gas instrument by selecting any gas instrument information from among the plurality of gas instrument information.

Embodiment 2

Figure 6:
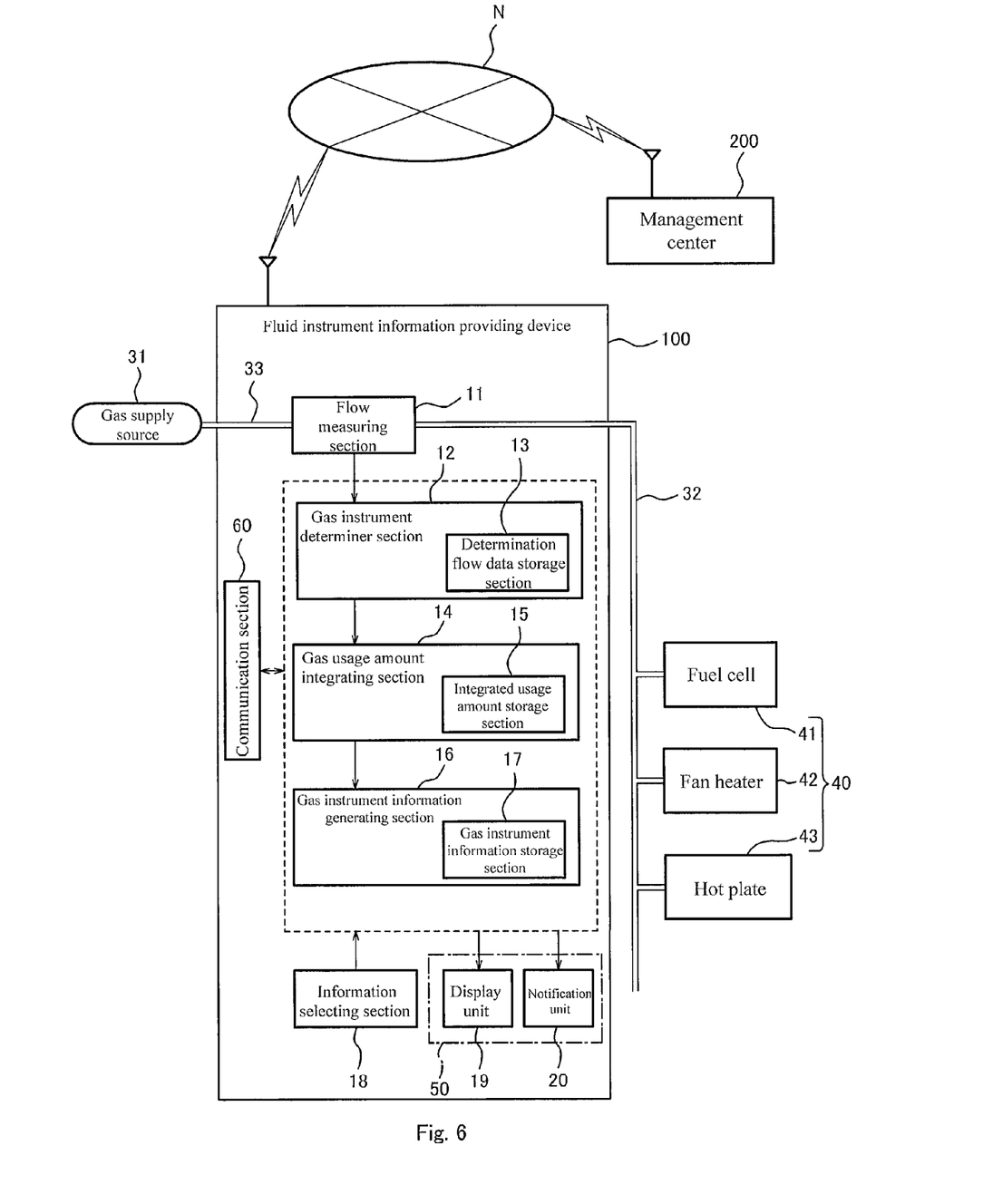
FIG. 6 is a block diagram showing an example of components of a fluid instrument information providing device according to Embodiment 2 of the present invention, and its utilization.

Next, Embodiment 2 of the present invention will be described with reference to FIG. 6. The components which are identical to those of Embodiment 1 will not be described repeatedly, and only the components which are different from those of Embodiment 1 will be described.

Embodiment 2 is different from Embodiment 1 in that a fluid instrument information providing device 100 further includes a communication section 60. The communication section 60 has a wired or wireless communication function, and is connected to a server of a management center 200 via network N through, for example, a public line. The communication section 60 transmits and receives information, commands and signals to and from the management center 200. In the example of FIG. 6, the fluid instrument information providing device 100 and the management center 200 construct a radio communication system. A master device corresponds to the server of the management center 200, while a slave device corresponds to the fluid instrument information providing device 100. The fluid instrument information providing device 100 (slave device) and the management center 200 (master device) may perform communication via a relay device (not shown) placed in a suitable location.

The server of the management center 200 is configured to include a computer, or the like, and implement the functions of a management section. The processor of the computer or the like executes operation programs to perform the corresponding processing, thereby implementing the functions.

In the above described configuration, in the fluid instrument information providing device 100, the gas instrument information generating section 16 may download a latest payment structure based on the integrated information from the server of the management center 200 and generate the gas charge information. Or, the server of the management center 200 may perform simulation calculation to generate the maintenance information and the replacement information, and the fluid instrument information providing device 100 may download a result of the calculation from the server. This makes it possible to mitigate a load imposed on the fluid instrument information providing device 100.

Although the fluid instrument information providing device in each of the above described embodiments provides the information relating to the gas instrument which uses the gas as the fluid, the present invention is not limited to this. The fluid instrument information providing device may be configured to provide information relating to tap water instruments such as a laundry machine, a bath, a shower, and a flush toilet, which use water as the fluid.

The present invention is not limited to the above described embodiments and may be changed in various ways within a scope defined in the claims, and an embodiment obtained by suitably combining technical means disclosed in different embodiments and plural modified examples is included in a technical scope of the present invention.

INDUSTRIAL APPLICABILITY

The present invention can be used in the field of a flow meter device having a function for providing information relating to an instrument which uses a fluid. Especially, the present invention is effectively applicable to a gas meter for household use, or the like, a tap water meter for household use, etc.

What is claimed is:

1. A fluid instrument information providing device comprising:
   a flow measuring section for measuring a flow of a fluid flowing in a fluid passage;
   an instrument determiner section for determining kinds of a plurality of instruments which use the fluid concurrently and are connected to the fluid passage in positions which are downstream of the flow measuring section, based on a change in the flow of the fluid which is measured by the flow measuring section as a sum of fluid flows in the plurality of instruments, which change occurs with time;
   a fluid usage amount integrating section for integrating a usage amount of the fluid for each of the kinds of the plurality of instruments which is determined by the instrument determiner section, based on the change in the flow of the fluid which is measured by the flow measuring section;
   an instrument information generating section for generating a plurality of instrument information including charge information relating to the instrument corresponding to the integrated usage amount for each kind of the instrument which is integrated by the fluid usage amount integrating section, based on the integrated usage amount;
   a selecting section operated by a user to select instrument information from among the plurality of instrument information generated by the instrument information generating section; and
   an output section for outputting the instrument information selected by the selecting section.

2. The fluid instrument information providing device according to claim 1,
   wherein the plurality of instrument information are charge information of the instrument corresponding to the instrument information, information relating to maintenance of the instrument corresponding to the instrument information, and information relating to replacement by purchase of the instrument corresponding to the instrument information.

3. The fluid instrument information providing device according to claim 1,
   wherein the output section is at least either a display unit for displaying the selected instrument information or a notification unit for notifying the selected instrument information.

4. The fluid instrument information providing device according to claim 1,
   wherein the fluid is a gas, and the instrument is a gas instrument which uses the gas.

5. The fluid instrument information providing device according to claim 1,
   wherein the instrument determiner section comprises a processor programmed to determine kinds of a plurality of instruments which use the fluid concurrently and are connected to the fluid passage in positions which are downstream of the flow measuring section, based on a change in the flow of the fluid which is measured by the flow measuring section as a sum of fluid flows in the plurality of instruments, which change occurs with time;

wherein the fluid usage amount integrating section comprises a processor programmed to integrate a usage amount of the fluid for each of the kinds of the plurality of instruments which is determined by the instrument determiner section, based on the change in the flow of the fluid which is measured by the flow measuring section; and wherein the instrument information generating section comprises a processor programmed to generate a plurality of instrument information including charge information relating to the instrument corresponding to the integrated usage amount for each kind of the instrument which is integrated by the fluid usage amount integrating section, based on the integrated usage amount.

* * * * *